US012122645B2

(12) United States Patent
Solomon

(10) Patent No.: US 12,122,645 B2
(45) Date of Patent: Oct. 22, 2024

(54) PORTABLE VACUUM LIFTER SYSTEM

(71) Applicant: Vacuworx Global, LLC, Tulsa, OK (US)

(72) Inventor: William J. Solomon, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 0 days.

(21) Appl. No.: 17/769,420

(22) PCT Filed: Oct. 23, 2020

(86) PCT No.: PCT/US2020/057079
§ 371 (c)(1),
(2) Date: Apr. 15, 2022

(87) PCT Pub. No.: WO2021/081336
PCT Pub. Date: Apr. 29, 2021

(65) Prior Publication Data

US 2024/0076167 A1 Mar. 7, 2024

Related U.S. Application Data

(60) Provisional application No. 62/925,448, filed on Oct. 24, 2019.

(51) Int. Cl.
*B66C 1/02* (2006.01)
*B66F 9/18* (2006.01)

(52) U.S. Cl.
CPC .......... *B66C 1/0281* (2013.01); *B66C 1/0256* (2013.01); *B66F 9/181* (2013.01)

(58) Field of Classification Search
CPC ... B66C 1/0218; B66C 1/0256; B66C 1/0281; B66C 1/0287; B66C 1/0293; B66F 9/181; E01C 19/524
See application file for complete search history.

(56) References Cited

U.S. PATENT DOCUMENTS

| | | | | |
|---|---|---|---|---|
| 3,578,372 A * | 5/1971 | Schuler | B66C 1/0218 248/363 |
| 4,925,225 A * | 5/1990 | Dost | B66C 1/0293 294/186 |
| 5,244,242 A | 9/1993 | Goedecke et al. | |
| 6,682,049 B2 * | 1/2004 | Thompson | E04F 21/20 254/8 R |
| 9,581,148 B1 * | 2/2017 | Solomon | B66C 1/0287 |
| 9,908,763 B2 * | 3/2018 | Bagge | B66F 9/0655 |
| 9,919,432 B1 * | 3/2018 | Morin | E01C 19/524 |
| 10,071,885 B2 * | 9/2018 | O'Brien | E02F 3/3654 |
| 10,163,334 B1 * | 12/2018 | Capps | B66C 1/0262 |

FOREIGN PATENT DOCUMENTS

| | | | | |
|---|---|---|---|---|
| CN | 208964361 U | 6/2019 | | |
| DE | 9300504 U1 | 5/1994 | | |
| EP | 2025941 A2 | 2/2009 | | |
| GB | 2120610 A * | 12/1983 | B62B 1/14 |
| JP | H09240999 A | 9/1997 | | |

* cited by examiner

*Primary Examiner* — Dean J Kramer
(74) *Attorney, Agent, or Firm* — Gable Gotwals

(57) ABSTRACT

A portable vacuum lifter system having a power source, drive motor, vacuum pump and reservoir contained in a readily carriable case. The system also has a vacuum pad in fluid communication with the vacuum pump via a vacuum line and a solenoid operated valve. The system is removably mountable on a small host vehicle for use in confined areas.

28 Claims, 7 Drawing Sheets

PORTABLE VACUUM LIFTER SYSTEM

CROSS-REFERENCE TO RELATED APPLICATIONS

This is the United States National Phase Application of PCT Application No. PCT/US2020/057079 filed 23 Oct. 2020 which claims priority to U.S. Provisional Patent Application No. 62/925,448 filed 24 Oct. 2019, each of which is incorporated herein by reference.

FIELD OF THE DISCLOSURE

The present disclosure relates generally to a vacuum lifter. More particularly, the present invention relates to compact and portable vacuum lifter contained in a carrying case.

BACKGROUND

Traditional vacuum lifters or material handlers are mounted on the boom of a full-size excavator, backhoe or other heavy equipment and are commonly used to move large diameter pipe and flat stock steel. These lifters have a beam suspended from the boom. The beam carries a vacuum reservoir and a drive motor coupled to a vacuum pump. One or more vacuum pads are suspended from the beam. The vacuum pads are contoured to the item being lifted. The boom and beam are maneuvered to put the vacuum pad in contact with the surface of the item to be lifted. Once in contact a valve is opened to create a vacuum between the pad and the surface of the item. When the vacuum reaches an acceptable level, the boom and beam can be maneuvered to lift the item.

While the traditional configuration works well on full size excavators and backhoes, it is not well suited for smaller sized equipment used in confined areas. One of the key restrictions is the lift capacity of the smaller equipment. The traditional design of the vacuum material handlers has the beam, drive motor, vacuum pump and vacuum reservoir suspended from the boom. On smaller equipment the weight of these components significantly reduces, if not eliminates, the lifting capacity of the boom. Further maneuvering a traditional vacuum material handler in an interior room or confined area is not practical.

What is needed, therefore, is a compact vacuum lifter system that can be readily carried by an individual. This system should also be located in a position where its weight does not reduce the lifting capacity of the boom.

SUMMARY

Embodiments of a portable vacuum lifter system of this disclosure include a portable vacuum lifter case containing vacuum lifter components and a vacuum pad that is connectable by a vacuum line to the case. Controls operate the vacuum lifter components contained by the case. The controls may include a three position switch, may be located on the case, or may include a wireless remote. The vacuum pad, which may be supported by (and removable from) a host machine by way of an eyelet, includes an elastomeric seal extending around a periphery of a bottom surface of the vacuum pad. The host machine may include an assembly for receiving the case, the case being removed after use. The case may include magnetic feet for connection to the host machine or assembly.

The case and vacuum pad may be moved to different host machines. The host machine may include a boom. The host machines may be a piece of agricultural, construction, industrial, residential, or landscaping piece of equipment such as but not limited to lift dollies, skid steers, electric skid steers, mini electric excavators, forklifts, and small cranes.

Opening of the case exposes or provides access to the vacuum lifter components. The vacuum lifter components include a drive motor coupled to a vacuum pump, a solenoid operated valve in fluid communication with the vacuum pump and a coupler that extends from the case for connection to a vacuum line, a vacuum gauge on the case for displaying a level of vacuum created, The case may include a reservoir and a reservoir vacuum gauge in communication with the reservoir.

Other vacuum lifter components may include a rechargeable battery and a battery charger. The case may include a warning indicator that indicates that vacuum pressure has fallen below a safe level or when vacuum pressure has reached a safe level for lifting.

In embodiments of a method of using a portable vacuum lifter system of this disclosure, the method includes: carrying the portable case and the vacuum pad to a desired location; suspending the vacuum pad from the boom of the host machine; temporarily securing the case to the host machine such that the case is within an operator's reach while operating the host machine; establishing fluid communication between the vacuum pad and the vacuum pump; maneuvering the host machine and boom to place a bottom surface of the vacuum pad in contact with an item to be lifted; manipulating the controls to turn on to put a power source in contact with the controls; manipulating controls to close a solenoid operated valve in the case to atmosphere and begin the operation of a drive motor and the vacuum pump contained by the case; once the necessary level of vacuum pressure is achieved, lifting the item by raising the boom of the host machine; once lifted, maneuvering the item into a desired location by operation of the host machine and boom; once the item has been placed in the desired location, manipulating the controls to release the item from the vacuum pad and terminating operation of the drive motor and the vacuum pump and for opening the solenoid operated valve to atmosphere, thereby releasing the vacuum pressure in the vacuum line and vacuum pad.

BRIEF DESCRIPTION OF THE DRAWINGS

Embodiments of a portable vacuum lifter system of this disclosure will now be described in further detail. Other features, aspects, and advantages of the present invention will become better understood with regard to the following detailed description, appended claims, and accompanying drawings (which are not to scale) where:

FIG. 1-B is a perspective view of an embodiment of a portable vacuum lifter of this disclosure mounted on a forklift using a fork lift assembly.

DETAILED DESCRIPTION

Figure 1A:
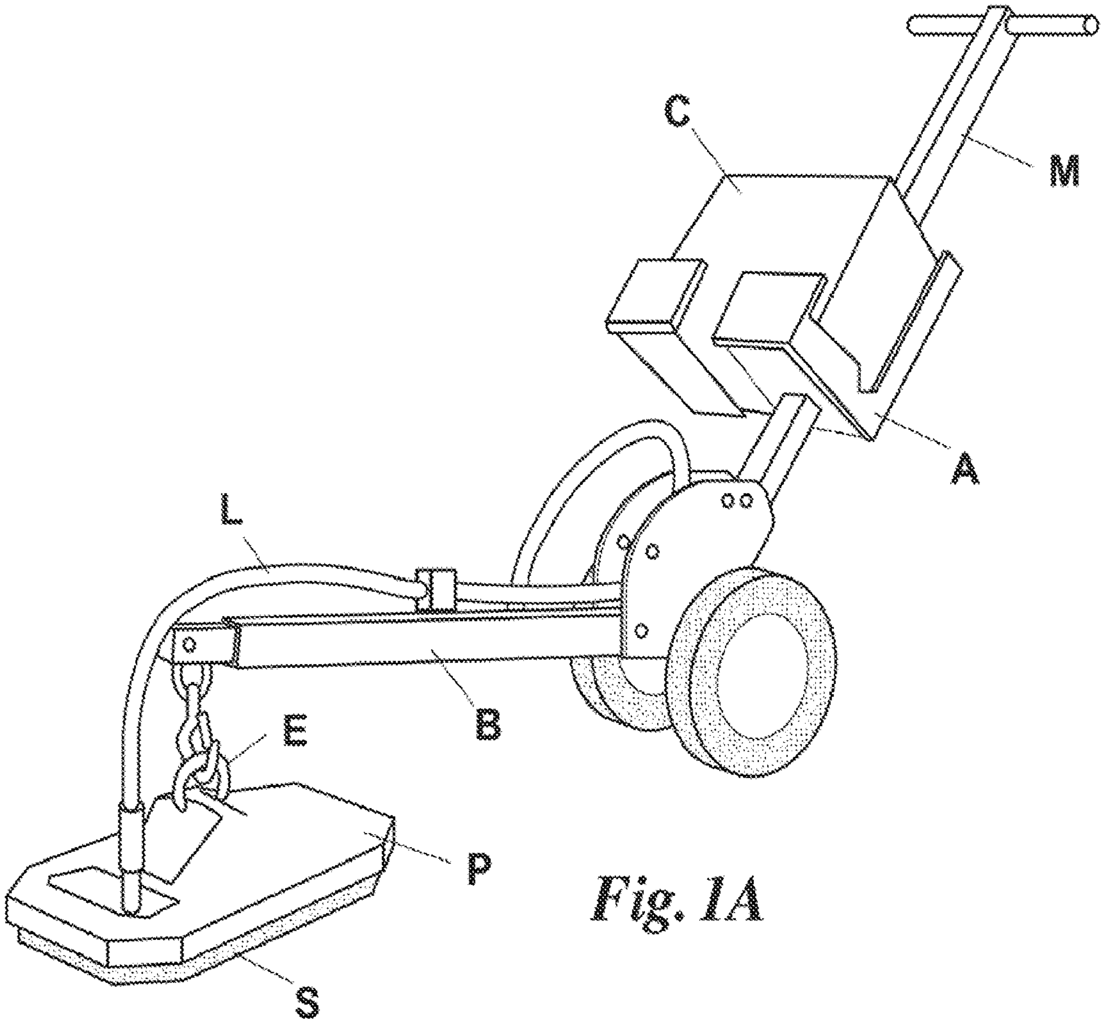
FIG. 1-A is a perspective view of an embodiment of a portable vacuum lifter of this disclosure mounted on a lift dolly. A case containing a vacuum pump mounts on the host vehicle and connects via a vacuum line to a vacuum pad connected to the host vehicle.
Figure 1B:
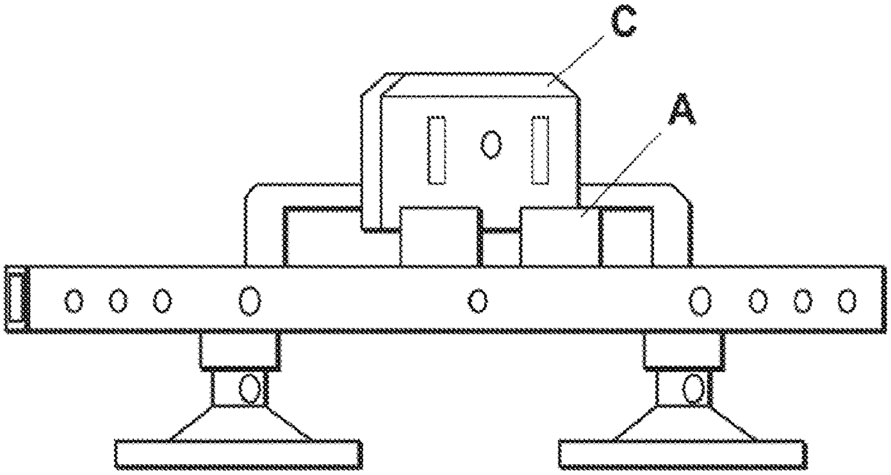
Figure 2:
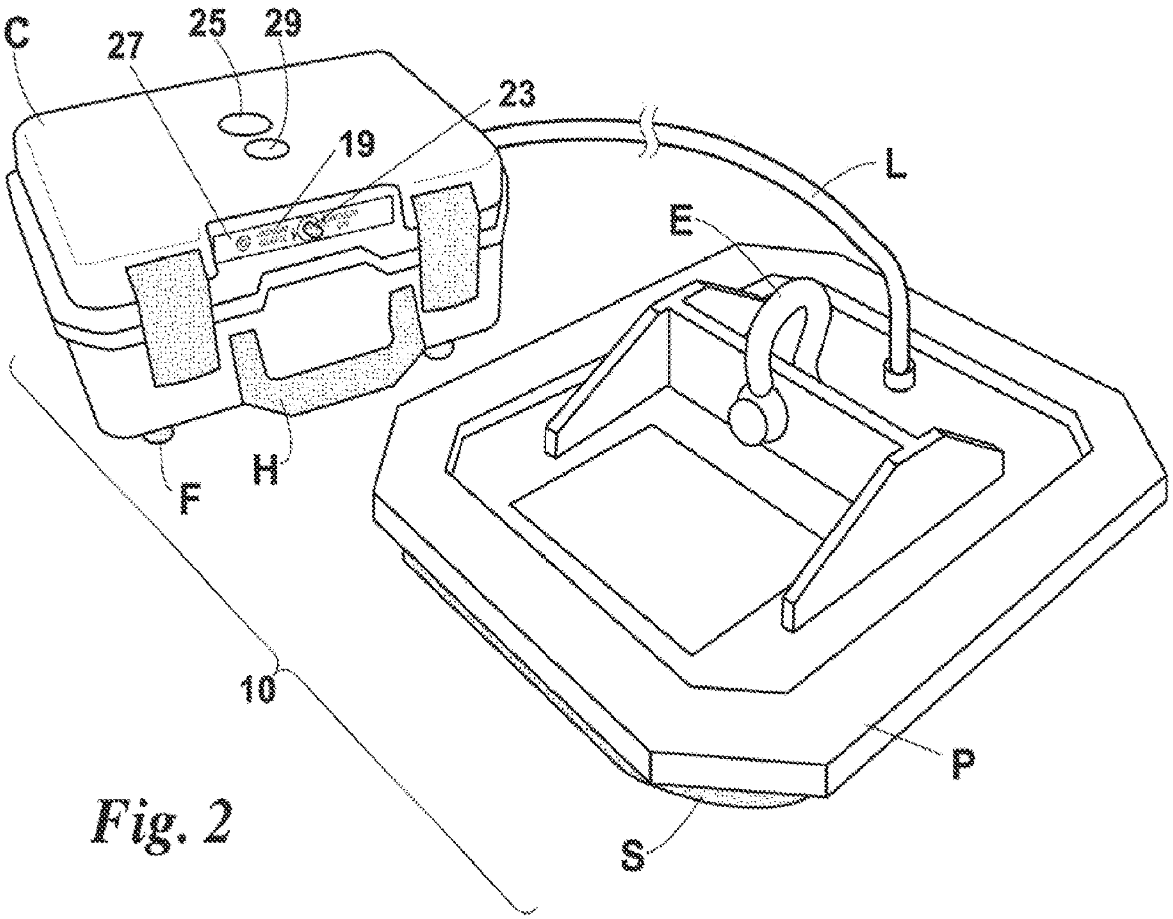
FIG. 2 is a perspective view of the case and vacuum pad.
Figure 3:
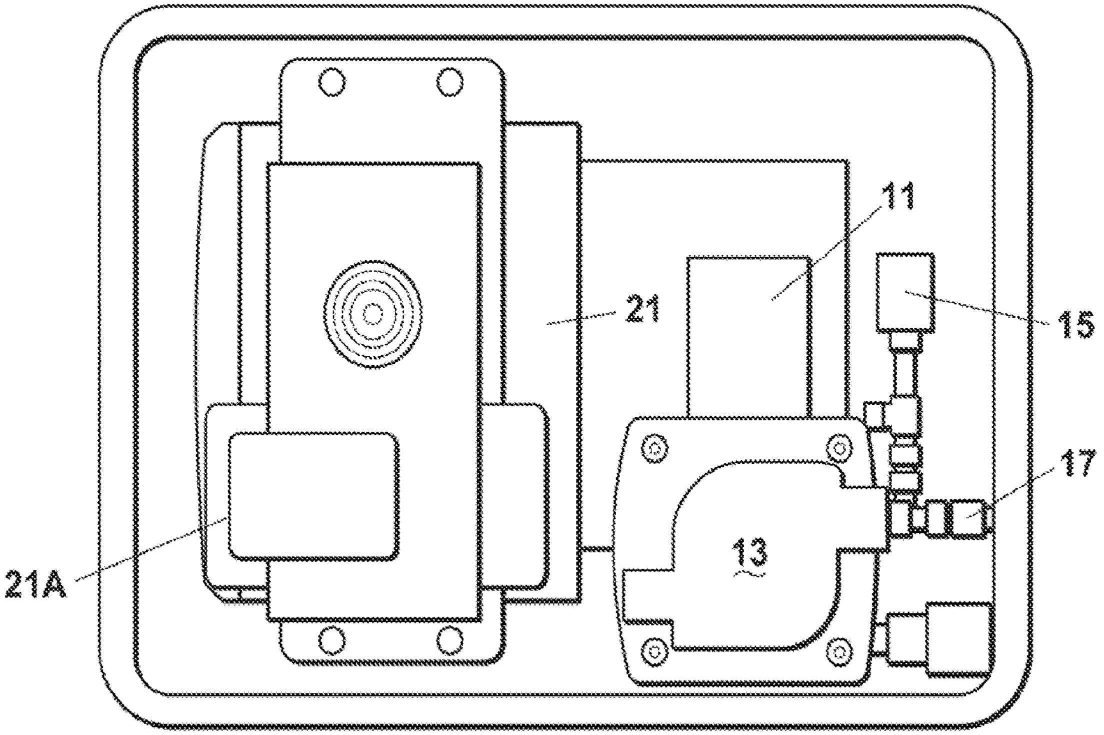
FIG. 3 is a view of the interior of the case of the portable vacuum lifter of FIG. 1.
Figure 4:
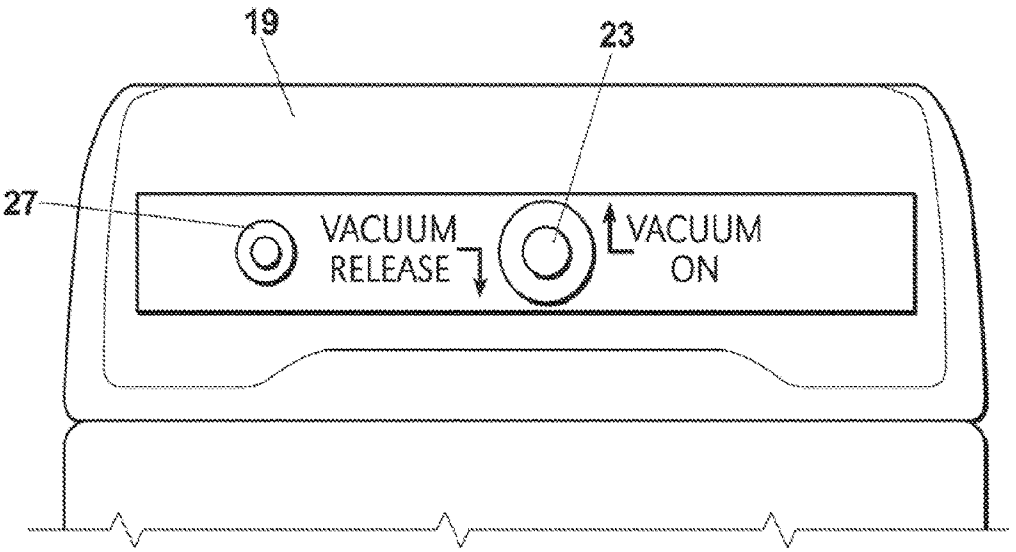
FIG. 4 is an enlarged view of the controls of the portable vacuum lifter of FIG. 1.
Figure 9:
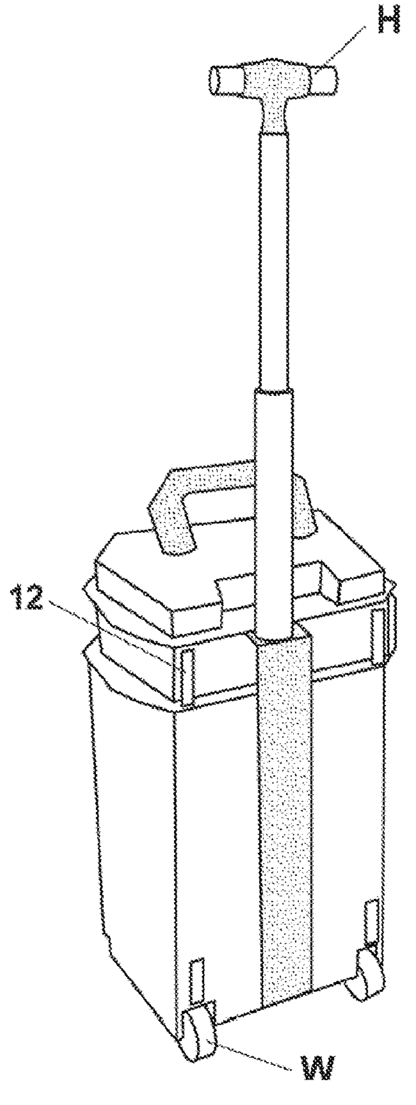
FIG. 9 is a rear isometric view of a embodiment of a case of this disclosure and illustrating the integral case wheels and the case handle in a fully extended position.

An embodiment of a portable vacuum lifter system 10 of this disclosure is shown in FIGS. 1A & 1B mounted on a host vehicle or machine M. The host machine M may include a boom B. The host machines M may be a piece of agricultural, construction, industrial, residential, or landscaping piece of equipment such as but not limited to lift dollies, skid steers, electric skid steers, mini electric excavators, forklifts, and small cranes. In embodiments, lifting capacity of the system 10 may be 150 lb (68 kg), 1,700 lb (0.8 tonne), 632 lb (287 kg), 1,195 lb (542 kg), 1,562 lb (709 kg), 2,500 lb (1.3 tonnes), or in a range of 150 lb (68 kg) to 2,500 lb (1.3 tonnes), there being discrete values and subranges within this broader range.

The system 10 includes a case C containing a drive motor 11 coupled to a vacuum pump 13. The case C also contains a solenoid operated valve 15 in fluid communication with the vacuum pump 13. A quick disconnect coupler 17 extends from the case C. In some embodiments, the system 10 may include an assembly A that mounts to the host machine M and carries the case C. By way of a non-limiting example, the assembly A may be arranged or configured for use with a lift dolly as in FIG. 1A, or a forklift as in FIG. 1B. The case C may include a set of feet F having magnets for removably mounting the case C onto the host machine M.

In embodiments, the system 10 has a vacuum pad P used to grab the object being lifted. The vacuum pad P has an eyelet E on the top and a generally flat bottom surface with an elastomeric seal S extending around the periphery of the bottom surface. In embodiments, the seal S may be a TOUGH SEAL™ (Vacuworx, Tulsa, Oklahoma). The vacuum pad P may be supported by the boom B of the host machine. A vacuum line L runs from the vacuum pad P to the quick disconnect coupler 17. The controls 19 for operating the system 10 may be located on the exterior of the case C. The case C may also have a handle H for ease of carrying.

In embodiments the drive motor 11 is electric, and a rechargeable battery 21 and battery charger 21A is located in the case C. In alternate embodiments an external power source such as an external battery or current source on the host machine M may be used to power the drive motor 11 and solenoid operated valve 15. The case C may include a voltage indicator 29.

In embodiments the controls 19 include a three-position switch 23. In the first position the system 10 is at rest with the vacuum pump 13 off and the solenoid operated valve 15 closed. In a second position solenoid operated valve 15 is closed to atmosphere and the vacuum pump 13 creates a vacuum between the pad P and the item being lifted. A vacuum gauge 25 on the case displays the level of vacuum created. In a third position of the switch 23, the vacuum pump 13 is off, and the solenoid operated valve 15 is open to atmosphere. There may also be a two-position switch 23 that isolates the power source from the drive motor 11 and solenoid operated valve 15.

The system 10 may also be equipped with a warning light 27 or audio alarm which indicates the vacuum pressure has fallen below a safe level. Likewise, the system 10 may also be equipped with a warning light 27 or audio alarm which indicates when the vacuum pressure has reached a safe level for lifting.

To use the system 10, the operator may hand carry the case C and vacuum pad P to the desired location. The pad P may be suspended from the boom B of the host machine M via the eyelet E on the top side of the pad P. The case C may be secured to the host machine M such that it is within the operator's reach while operating the host machine M. The vacuum pad P is put in fluid communication with the vacuum pump 13 by attaching the vacuum line L to the quick disconnect coupler 17. The portable vacuum lifter system 10 is then ready for operation.

The operator maneuvers the host machine M and boom B to place the bottom surface of the vacuum pad P in contact with the item to be lifted. Once in place the three position switch 23 is turned on to put the power source in contact with the controls 19. The operator then moves the switch 23 to the second position. This closes the solenoid operated valve 15 to atmosphere and begins the operation of the drive motor 11 and in turn the vacuum pump 13. Once the necessary level of vacuum pressure is met, the item may be lifted by raising the boom B of the host machine M. Once lifted the item may be maneuvered into the desired location by operation of the host machine M and boom B. Once the item has been placed in the desired location, it is released from the vacuum pad P by putting the switch 23 into its third position. This terminates operation of the drive motor 11 and vacuum pump 13. It also opens the solenoid operated valve 15 to atmosphere. Thus, the vacuum pressure in the vacuum line L and pad P are released.

Figure 5:
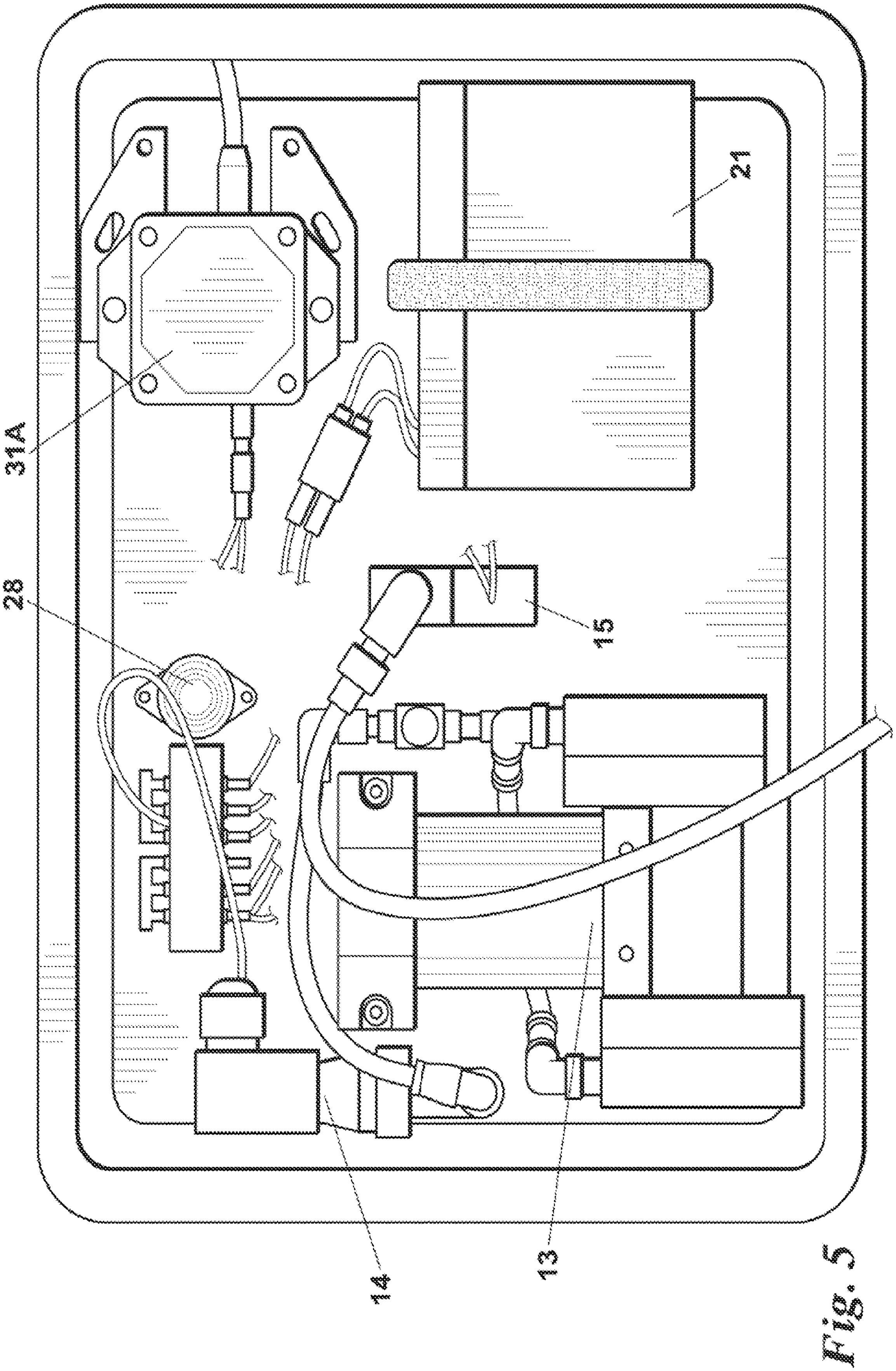
FIG. 5 is a view of the interior of the case of another embodiment of a portable vacuum lifter of this disclosure.

Referring now to FIG. 5, another embodiment of a portable vacuum lifter system 10 of this disclosure includes a case C containing a twin-head (or dual stage) vacuum pump 13, a reservoir, and associated vacuum gauge 25; a vacuum control switch 14 and actuation valve 15; a large capacity battery 21 and associated charger and voltage meter 29; an audible alarm 28; and a wireless remote 31, 31A. The case C may include a set of feet 12 having magnets for removably mounting the case onto the host machine M. The twin-head vacuum pump 13 helps keep amperage requirements down, provides for faster evacuation, and allows for use of a larger vacuum pad P than the embodiment of FIGS. 1-4. In embodiments, the pump 13 may be a 4 Ah pump. Lift and release may occur in less than 2 seconds. The reservoir provides for faster actuation of the vacuum and a same safety factor as much larger vacuum lifters provide in holding vacuum for a short period of time should the power source fail. The battery 21, which may be a 12 V 22 Ah battery, may include onboard "smart" charger may be provided that prevents overcharging. The alarm 28 may be set to alert when a predetermined preset pressure is achieved. The case C and its controls 19 may be in communication with a wireless remote 31 or the controls 19 may be actuated manually (or both).

Figure 6:
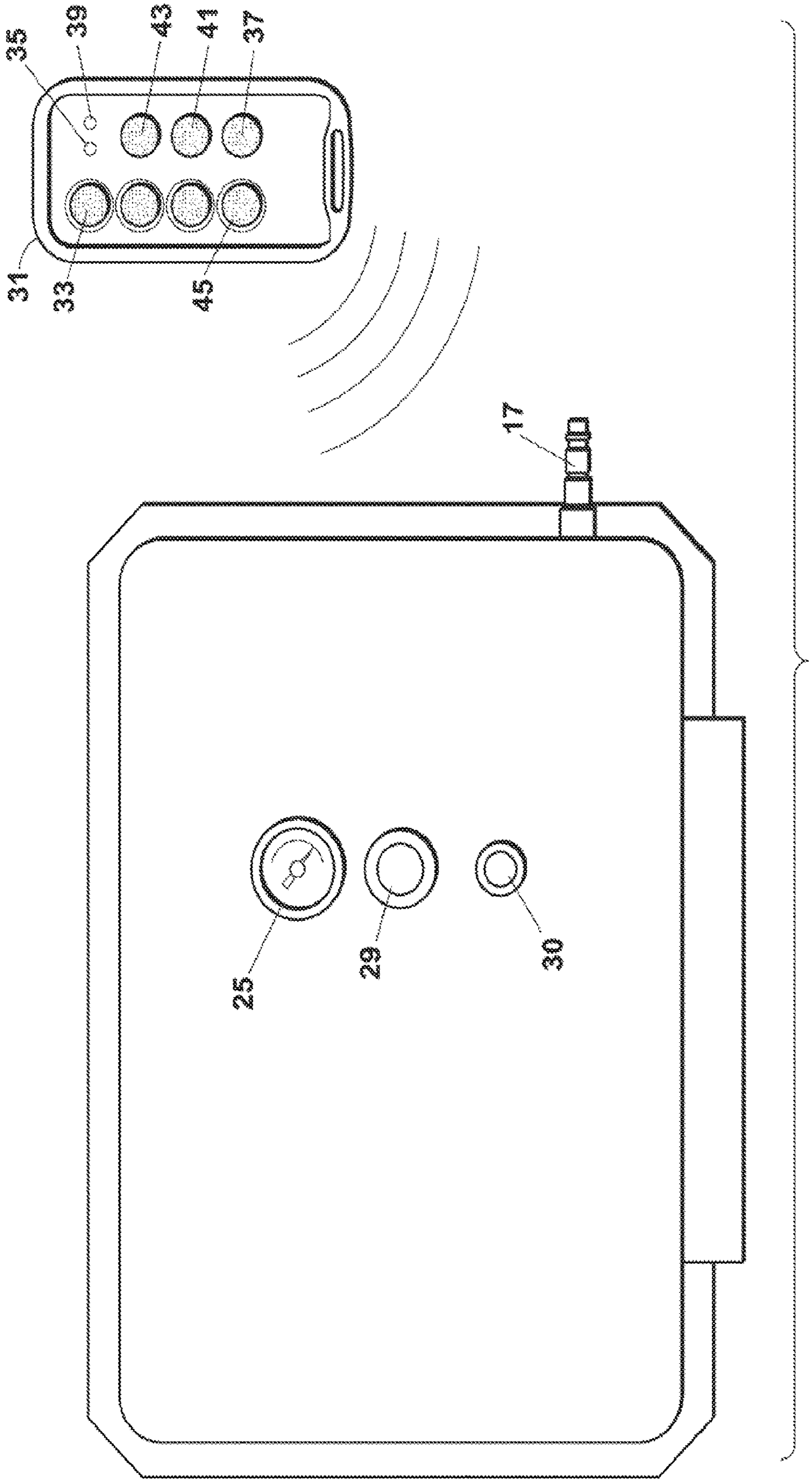
FIG. 6 is view of the exterior of the case of yet another embodiment of a portable vacuum lifter of the present disclosure.
Figure 7:
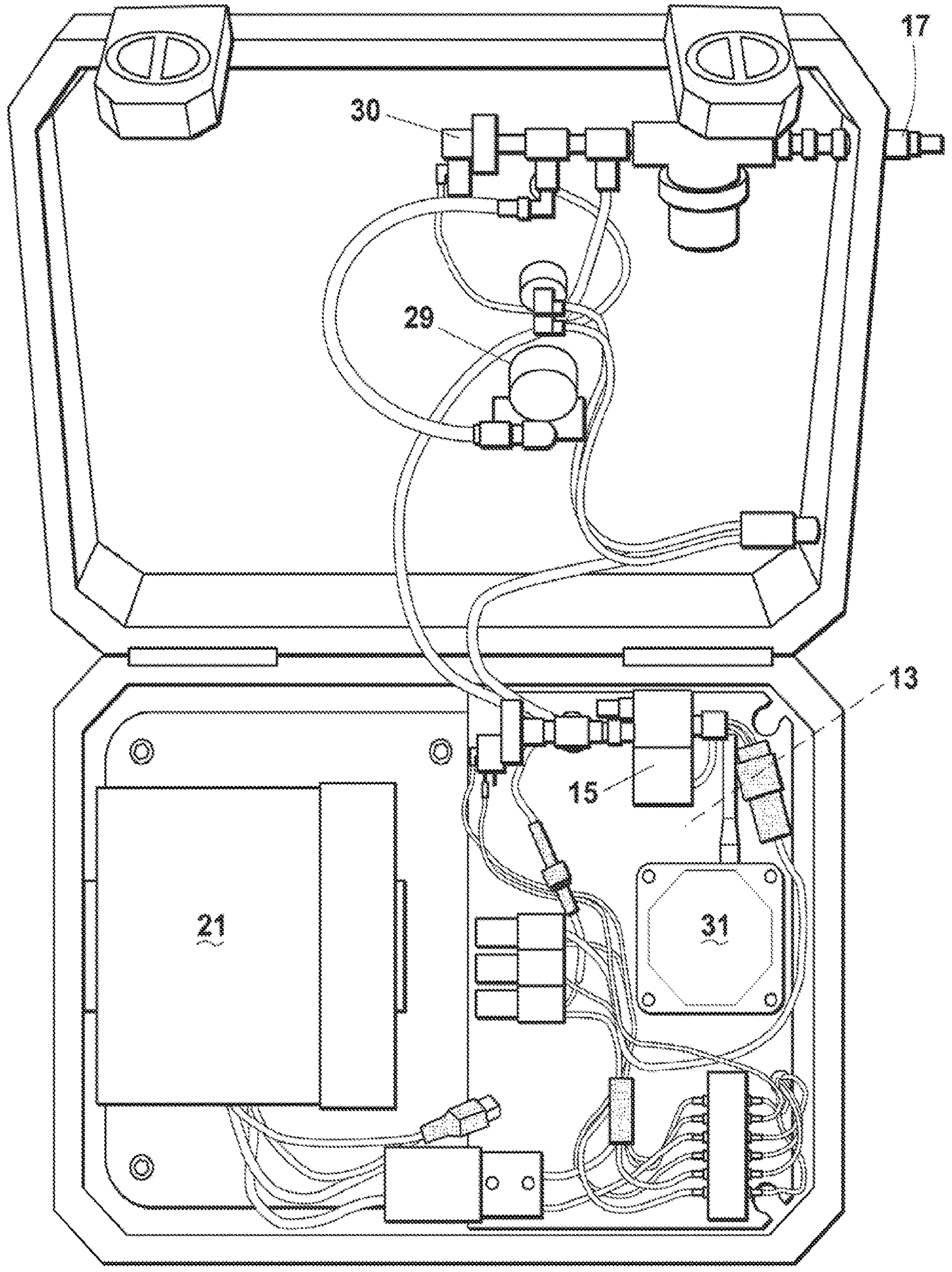
FIG. 7 is a view of the interior of the case of the portable vacuum lifter of FIG. 6.
Figure 8:
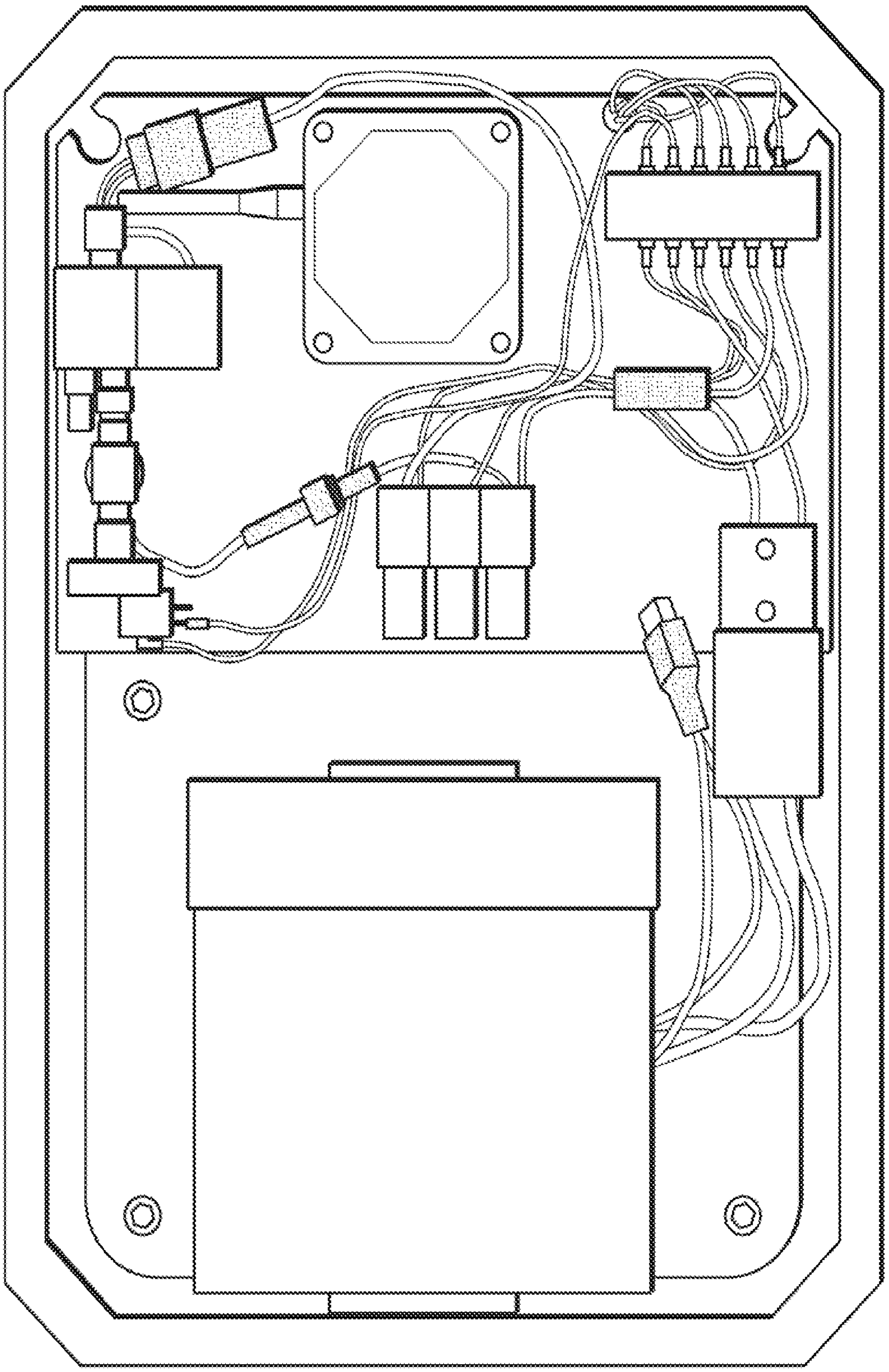
FIG. 8 is another view of the interior of the case of the portable vacuum lifter of FIG. 6.

Referring now to FIGS. 6-8, another embodiment of a portable vacuum lifter system 10 of this disclosure includes a case C providing a vacuum gauge 25, battery 21 and voltage meter 29, a power button and a vacuum indicator light 30 on an exterior of the case C. Similar to the embodiment of FIG. 5 the case contains a twin-head (or dual stage) vacuum pump 13, a reservoir, and associated vacuum gauge 25; a vacuum control switch and actuation valve 15; a large capacity battery 21 and associated charger and voltage meter 29; an audible alarm; and a wireless remote 31. The case C may include a set of recessed feet 12 having magnets for removably mounting the case C onto the host machine M. The handle H may be an extendable handle. The case C may also include wheels W for rolling the case C like a piece of lugging to a desired location.

Similar to the embodiment of FIG. 5, the twin-head vacuum pump 13 helps keep amperage requirements down, provides for faster evacuation, and allows for use of a larger vacuum pad P than the embodiment of FIGS. 1-4. In embodiments, the pump 13 may be a 4 Ah pump. Lift and release may occur in less than 2 seconds. The reservoir provides for faster actuation of the vacuum and a same safety factor as much larger vacuum lifters provide in holding vacuum for a short period of time should the power source fail. The battery 21, which may be a 12 V 22 Ah battery, may include onboard "smart" charger may be provided that prevents overcharging. The alarm may be set to alert when a predetermined preset pressure is achieved.

The case C and its controls 19 may be in communication with a wireless remote 31 or the controls 19 may be actuated manually (or both). In embodiments of the remote, an operator turns on the remote 31 by holding a top red button 33 for 3-6 seconds or until the red battery light 35 comes on. A green light 39 on the remote 31 and a receiver inside the case C will start flashing continuously, indicating they are connected. To make sure the remote 31 is close enough to find a connection to the receiver (e.g. within 30 ft or 9.1 m), the operator can hold the green button 37 on the remote 31 for 3-6 seconds or until the green light 39 starts flashing on the remote 31.

In embodiments, the transmitter is configured for two-handed operation. To lift load, the operator holds the right black button 41 for 3-5 seconds to create vacuum on the pad P. Once the vacuum gauge 25 is in the green range, it is safe to lift the load. To release load, the operator lowers the load to the ground and holds both yellow buttons 43, 45 simultaneously for 3-5 seconds to start releasing vacuum. When gauge 25 reaches zero, it is safe to remove pad P from the load. For safety purposes, there will be approximately a 3 second delay on the release function.

The foregoing description details certain embodiments of the present invention and describes the best mode contemplated, it will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A portable vacuum lifter system comprising:

a portable vacuum lifter case containing vacuum lifter components, said vacuum lifter components comprising a drive motor coupled to a vacuum pump, a solenoid operated valve in fluid communication with the vacuum pump, a coupler that extends from the case, a vacuum gauge on the case for displaying a level of vacuum created, a host machine including a mounting assembly for removably mounting the case to the host machine, the case including a set magnets arranged for connection to the mounting assembly;

a vacuum pad for grabbing an object to be lifted, said vacuum pad having a top surface and a generally flat bottom surface, an elastomeric seal extending around a periphery of the bottom surface, said vacuum pad supported by the host machine, said vacuum pad connected to said coupler of said case via a vacuum line; and controls for operating said vacuum lifter components.

2. The portable vacuum lifter system according to claim 1 wherein:

wherein the host machine includes a boom.

3. The portable vacuum lifter system according to claim 2 wherein:

the host machine is a lift dolly.

4. The portable vacuum lifter system according to claim 2 wherein:

the host machine is a fork lift.

5. The portable vacuum lifter system according to claim 2 further comprising:

an eyelet extending from said top surface of said vacuum pad for suspending said vacuum pad from said boom of said host machine.

6. The portable vacuum lifter system according to claim 1 wherein:

the coupler is a quick disconnect coupler.

7. The portable vacuum lifter system according to claim 1 wherein:

said vacuum lifter components comprise a rechargeable battery and battery charger.

8. The portable vacuum lifter system according to claim 1 wherein:

an external power source is used to power the drive motor and solenoid operated valve.

9. The portable vacuum lifter system according to claim 8, wherein:

the external power source is an external battery.

10. The portable vacuum lifter system according to claim 8, wherein:

the external power source is a current source on the host machine.

11. The portable vacuum lifter system according to claim 1 further comprising:

a warning indicator that indicates that vacuum pressure has fallen below a safe level.

12. The portable vacuum lifter system according to claim 1 further comprising:

a warning indicator that indicates when vacuum pressure has reached a safe level for lifting.

13. The portable vacuum lifter system according to claim 1 further comprising:

a reservoir; and a reservoir vacuum gauge in communication with said reservoir.

14. The portable vacuum lifter system according to claim 1 wherein:

said case comprises a set of feet having the magnets.

15. The portable vacuum lifter system according to claim 1 wherein:

the controls are located on an exterior of the case.

16. The portable vacuum lifter system according to claim 1 wherein:

said controls comprise a three-position switch having a first position, a second position, and a third position.

17. The portable vacuum lifter system according to claim 16 wherein:

said first position is a rest position wherein the vacuum pump is off and the solenoid operated valve closed;

in said second position, the solenoid operated valve is closed to atmosphere and the vacuum pump creates a vacuum between the vacuum pad and an item being lifted;

in said third position, the vacuum pump is off, and the solenoid operated valve is open to atmosphere.

18. The portable vacuum lifter system according to claim 1, wherein:

said controls comprise a two-position switch that isolates a power source from the drive motor and from the solenoid operated valve.

19. The portable vacuum lifter system according to claim 1, wherein:

the case and the controls communicate with a wireless remote.

20. A method of using a portable vacuum lifter system comprising:

carrying a portable case and a vacuum pad to a desired location;

suspending the vacuum pad from a boom of a host machine;

securing the case to the host machine such that the case is within an operator's reach while operating the host machine;

establishing fluid communication between the vacuum pad and a vacuum pump of the case by connecting a vacuum line extending from the case to the vacuum pad;

maneuvering the host machine and boom to place a bottom surface of the vacuum pad in contact with an item to be lifted;

manipulating controls to turn on to put a power source in contact with the controls;

manipulating controls to close a solenoid operated valve in said case to atmosphere and begin the operation of a drive motor and a vacuum pump in said case;

once the necessary level of vacuum pressure is achieved, lifting the item by raising the boom of the host machine;

once lifted, maneuvering the item into a desired location by operation of the host machine and boom;

once the item has been placed in the desired location, manipulating the controls to release the item from the vacuum pad and terminating operation of the drive motor and vacuum pump and for opening the solenoid operated valve to atmosphere, thereby releasing the vacuum pressure in the vacuum line and vacuum pad.

21. A portable vacuum lifter system comprising:

a portable vacuum lifter case containing vacuum lifter components, said vacuum lifter components comprising a drive motor coupled to a vacuum pump, a solenoid operated valve in fluid communication with the vacuum pump, a coupler that extends from the case, a vacuum gauge on the case for displaying a level of vacuum created;

a host machine including a mounting assembly for removably mounting the case to the host machine;

a vacuum pad for grabbing an object to be lifted, said vacuum pad having a top surface and a generally flat bottom surface, an elastomeric seal extending around a periphery of the bottom surface, said vacuum pad supported by the host machine, said vacuum pad connected to said coupler of said case via a vacuum line; and controls for operating said vacuum lifter components, wherein:

said controls comprise a three-position switch having a first position, a second position, and a third position; the first position is a rest position wherein the vacuum pump is off and the solenoid operated valve closed, in the second position the solenoid operated valve is closed to atmosphere and the vacuum pump creates a vacuum between the vacuum pad and an item being lifted; and in the third position, the vacuum pump is off the solenoid operated valve is open to atmosphere.

22. The portable vacuum lifter system of claim 21, wherein the case includes a set magnets arranged for connection to the mounting assembly.

23. The portable vacuum lifter system of claim 22, said case comprises a set of feet having the magnets.

24. A portable vacuum lifter system comprising:

a host machine;

a portable vacuum lifter case containing vacuum lifter components, said vacuum lifter components comprising a drive motor coupled to a vacuum pump, a solenoid operated valve in fluid communication with the vacuum pump, a coupler that extends from the case, a vacuum gauge on the case for displaying a level of vacuum created, the case including a set magnets arranged for connection to the host machine;

a vacuum pad for grabbing an object to be lifted; and controls for operating said vacuum lifter components; wherein the controls comprise a three-position switch having a first position, a second position, and a third position; the first position is a rest position wherein the vacuum pump is off and the solenoid operated valve closed, in the second position the solenoid operated valve is closed to atmosphere and the vacuum pump creates a vacuum between the vacuum pad and an item being lifted; and in the third position, the vacuum pump is off the solenoid operated valve is open to atmosphere.

25. The portable vacuum lifter system of claim 24, further comprising the vacuum pad having a top surface and a generally flat bottom surface, an elastomeric seal extending around a periphery of the bottom surface, said vacuum pad supported by the host machine, said vacuum pad connected to said coupler of said case via a vacuum line.

26. The portable vacuum lifter system of claim 24, further comprising the host machine including a mounting assembly for removably mounting the case to the host machine.

27. The portable vacuum lifter system of claim 24, further comprising the host machine including a handle at one end and a boom at another end for connection to the vacuum pad.

28. The portable vacuum lifter system of claim 24, further comprising the case including a set of feet having the magnets.

* * * * *